US 6,602,307 B2

(12) United States Patent  (10) Patent No.: US 6,602,307 B2
Poirier  (45) Date of Patent: Aug. 5, 2003

(54) BYPASS AIR FILER

(75) Inventor: Bertrand Poirier, Bouctouche (CA)

(73) Assignee: Kanalflakt Inc., Bouctouche (CA)

( * ) Notice: Subject to any disclaimer, the term of this patent is extended or adjusted under 35 U.S.C. 154(b) by 0 days.

(21) Appl. No.: 09/867,344

(22) Filed: May 29, 2001

(65) Prior Publication Data

US 2002/0178695 A1 Dec. 5, 2002

(51) Int. Cl.⁷ ............................................. B01D 35/30
(52) U.S. Cl. .................. 55/385.2; 55/467; 55/486; 55/DIG. 35
(58) Field of Search ................. 55/385.2, 467, 55/472, 486, DIG. 35

(56) References Cited

U.S. PATENT DOCUMENTS 3,355,155 A * 11/1967 Heltzen et al. ............. 261/130
4,676,954 A *  6/1987 Wilson ....................... 126/113

OTHER PUBLICATIONS

Energy Design Update, "New Whole–House HEPA filter", vol. 22, No. 3, Mar. 2002, pp. 11–12.*
Pure Air Systems,"Installation Instructions, Model 1200HS Poweraide HEPA Shield HEPA Filtration System", 1997, pp. 1–12.*
Copy of a product brochure entitled "Airborne Assailants" by Venmar Ventiliation Inc. dated Mar. 2000.

* cited by examiner

Primary Examiner—Robert A. Hopkins
(74) Attorney, Agent, or Firm—Renner, Otto, Boisselle & Sklar, LLP

(57) ABSTRACT

A bypass air filter is provided for attachment to the return air duct of an existing forced air conditioning system. The bypass air filter has a housing that defines a bypass air channel between an air inlet opening and an air outlet opening. The housing attaches directly to the return air duct so that the air inlet and outlet openings connect with complementary openings in the return air duct. This arrangement eliminates the need for bypass air ducting between the return air duct and the bypass air filter. The housing retains an air filter, which bisects the bypass air channel, and a fan for drawing air in through the air inlet opening through the air filter and out the air outlet opening. An upstream baffle extends from the housing into the upstream air flow through the return air duct to direct air into the air inlet opening. A downstream baffle extends from the housing away from the upstream air flow through the return air duct to draw air out of the air outlet opening. This arrangement increases the efficiency of the bypass air filter.

16 Claims, 2 Drawing Sheets

BYPASS AIR FILER

FIELD OF THE INVENTION

The present invention relates to air filters and, more particularly, to an apparatus for filtering air that is diverted from the return air duct of a forced air conditioning system.

BACKGROUND OF THE INVENTION

An increased sensitivity to airborne particulate and other contaminants has created a need for air filtering systems that can complement existing forced air conditioning systems.

Commercially available air filtering systems employ a series of bypass ducts to divert air from the return air duct of an existing forced air conditioning system through an auxiliary air filter before returning the air back to the return air duct. Although this system may reduce airborne particulate and reduce the risk of clogging the existing air conditioning system, the bypass ducts are cumbersome to install and increase the cost of the air filtering system.

Accordingly, there is a need for a less expensive bypass air filter that is easier to install.

SUMMARY OF THE INVENTION

It is an object of the present invention to provide a bypass air filter to reduce airborne particulate and reduce the risk of clogging an existing air conditioning system.

Advantageously, the present invention may be less expensive and simpler to install than presently available bypass air filters by attaching directly to the return air duct of an air conditioning system, thereby eliminating the need for bypass ducting.

In accordance with a aspect of the present invention there is provided a bypass air filter for attachment to an existing return air duct, comprising: a housing for retaining a planar air filter, said housing defining a bypass air channel between an air inlet opening and an air outlet opening; and an upstream baffle for extending into said return air duct, said upstream baffle extending at an angle substantially perpendicular to said planar air filter when said planar air filter is retained by said housing in order to facilitate air flow through said bypass air channel.

In accordance with another aspect of the present invention there is provided a bypass air filter for attachment to an existing return air duct, comprising: a housing comprising a faceplate and a box; the box having an open end; the faceplate having an air inlet opening and an air outlet opening; wherein the open end of the box is attachable to the faceplate to form a bypass air channel between the air inlet opening and the air outlet opening; a fan for facilitating air flow in through the air inlet opening and out through the air outlet opening; an upstream baffle extending from the face plate for extending upstream into the air flow path of the existing return air duct for scooping air into the air inlet opening; a downstream baffle extending from the face plate for extending downstream into the air flow path of the existing return air duct for facilitating air flow out of the air outlet opening; and a filter retained within the bypass air channel intermediate the air inlet opening and the air outlet opening.

BRIEF DESCRIPTION OF THE DRAWINGS

In figures which illustrate embodiments of the invention, by way of example only.

Like reference numerals are used in different figures to denote like components.

DETAILED DESCRIPTION OF THE PREFERRED EMBODIMENT

Figure 1:
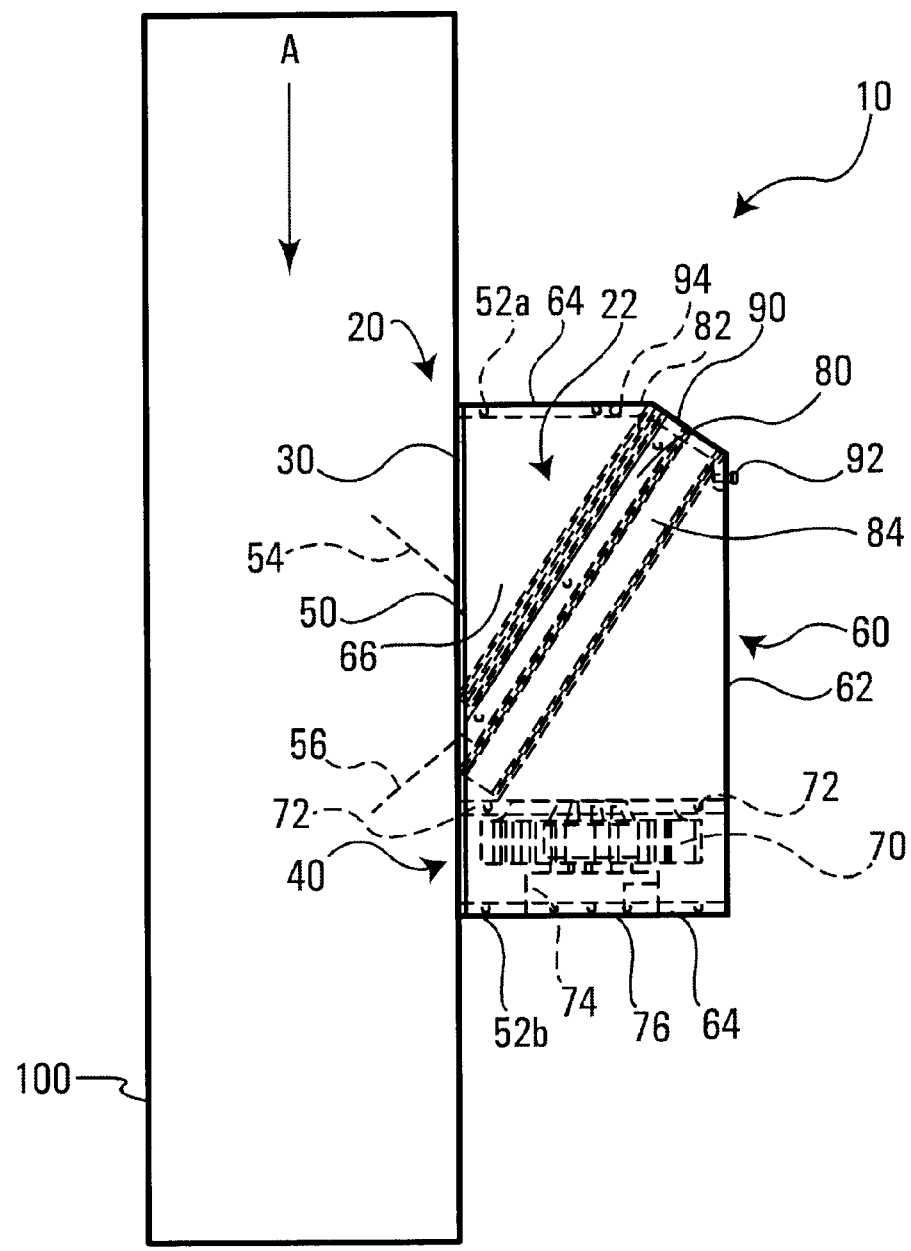
FIG. 1 illustrates a cross sectional side view of a bypass air filter in accordance with this invention attached to a section of existing return air duct.
Figure 2:
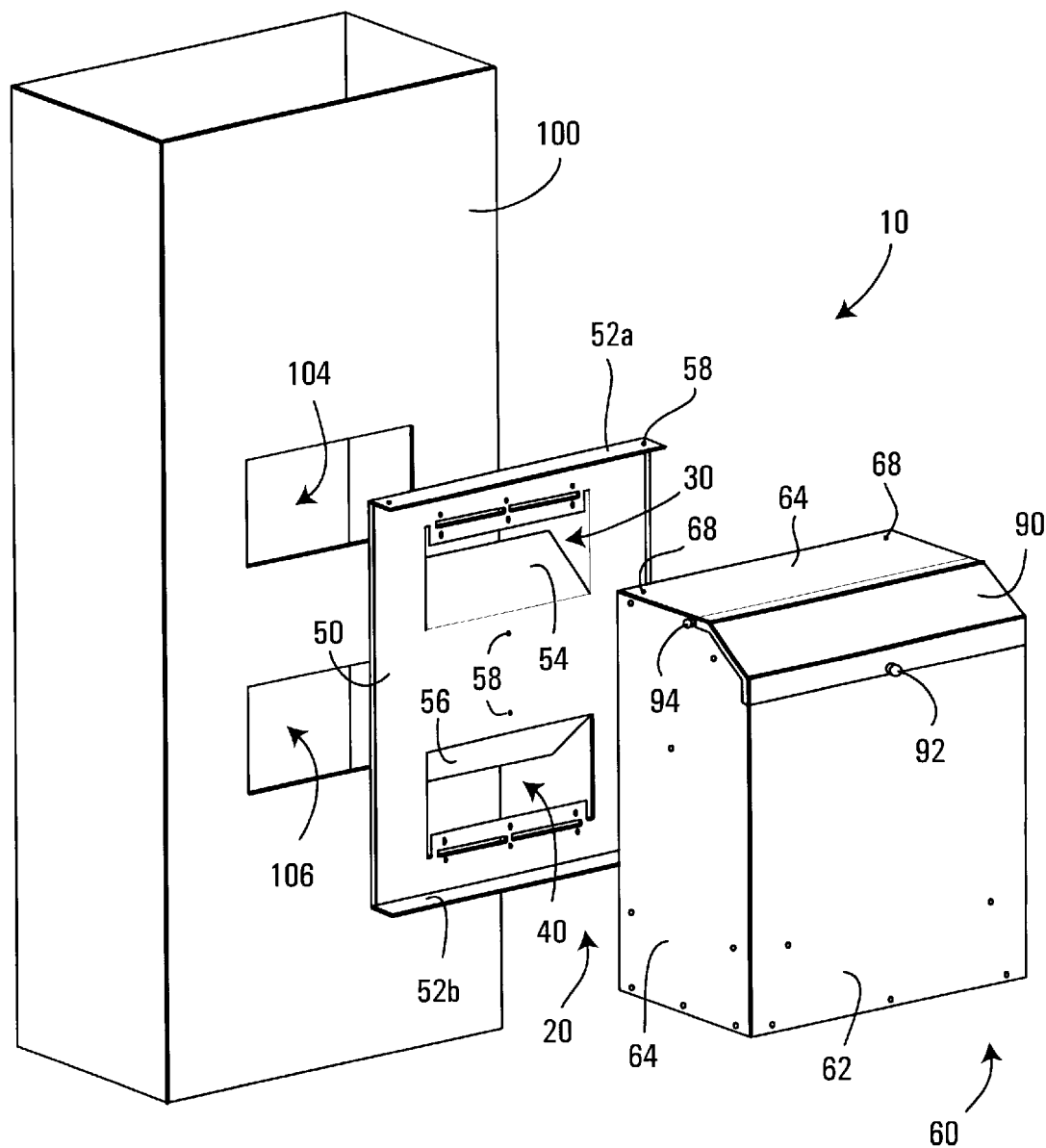
FIG. 2 illustrates an exploded view of the bypass air filter and a section of an existing return air duct.

With reference to FIGS. 1 and 2 a bypass air filter 10 is provided for attachment to an existing section of a return air duct 100.

Bypass air filter 10 comprises a housing 20 that defines a bypass air channel 22 between an air inlet opening 30 and an air outlet opening 40. Housing 20 comprises a faceplate 50 and a box 60, which are both made of sheet metal or any other suitably sturdy material.

As best seen in FIG. 2, faceplate 50 is a rectangular piece of sheet metal with one set of opposing ends folded perpendicularly inward to form mounting flaps 52a and 52b. Air inlet opening 30 and air outlet opening 40 are formed by bending two rectangular panels outward from faceplate 50 to form upstream baffle 54 and downstream baffle 56. Faceplate 50 is provided with a plurality of pilot holes 58 to facilitate mounting of faceplate 50 directly to return air duct 100 and to box 60.

Box 60 generally has a closed end 62 and four contiguous sides 64 extending therefrom to form an open end 66. Two opposing contiguous sides 64 have complementary pilot holes 68. Faceplate 50 is mounted directly to box 60 by screwing mounting flaps 52a and 52b to opposing contiguous sides 64 through pilot holes 58 and complementary pilot holes 68. Faceplate 50 is mounted to box 60 so that it covers open end 66 to form bypass air channel 22.

It will be appreciated that box 60 can be any number of shapes and sizes so long as it defines a bypass air channel 22 between air inlet opening 30 and air outlet opening 40 when mounted to faceplate 50. It will also be appreciated that box 60 may be mounted to faceplate 50 in any number of ways, such as by nails, screws, rivets, bolts, adhesives or welds.

A filter shelf 80 is mounted within box 60 to bisect bypass air channel 22. Filter shelf 80 is arranged to retain a pre-filter 82 and a high efficiency particulate arrestance filter 84 intermediate air inlet opening 30 and air outlet opening 40 so that any air flowing through bypass air channel 22 passes through both pre-filter 82 and high efficiency particulate arrestance filter 84.

Box 60 is provided with a filter access door 90 that pivots about hinge 94 and is kept closed by thumbscrew 92. Preferably, filter access door 90 is arranged at an oblique angle to box 60 to facilitate air flow through bypass air channel 22. By unscrewing thumbscrew 92, filter access door 90 may be opened to add or replace pre-filter 82 or high efficiency particulate arrestance filter 84.

An electric fan 70 is mounted in the bottom portion of box 60 by mounting brackets 72. An electrical box 74 is provided under electric fan 70 to connect electric fan 70 to a power source. Electrical box 74 is accessed through a removable electrical box cover 76 in the bottom of contiguous side 64. When activated, electric fan 70 draws air in through air inlet opening 30 and out through air outlet opening 40 to create air flow through bypass air channel 22.

It will be appreciated that the arrangement of pre-filter 82, high efficiency particulate arrestance filter 84 and electric fan 70 may be altered so long as electric fan 70 creates air flow through both pre-filter 82 and high efficiency particulate arrestance filter 84.

In order to install bypass air filter 10, two holes 104 and 106, in matching arrangement with air inlet opening 30 and air outlet opening 40, must be cut into an existing section of return air duct 100. Faceplate 50 is mounted directly onto return air duct 100 through pilot holes 58 so that baffles 54 and 56 extend though holes 104 and 106 into return air duct 100. Advantageously, this arrangement eliminates the need for bypass air ducts between return air duct 100 and bypass air filter 10.

As shown in FIG. 1, air flows through return air duct 100 in a downstream direction A. In the preferred embodiment, baffle 54 is a scoop that extends in the air flow path in return air duct 100 to direct (scoop) air into air inlet opening 30 and through bypass air channel 22. Preferably baffle 54 extends in the air flow path at an angle substantially perpendicular to pre-filter 82 and high efficiency particulate arrestance filter 84 to help maximize the airflow through the filters. Baffle 56 extends downstream into the air flow path in return air duct 100 to create a low pressure area in front of air outlet opening 40, which assists in drawing air through bypass air channel 22 and out of air outlet opening 40. Advantageously, this arrangement of baffles 54 and 56 increases the efficiency of bypass air filter 10.

Indeed, in some embodiments, the baffles may provide for sufficiently large air flow through bypass air channel 22 that electric fan 70 is unnecessary. In other embodiments, with electric fan 70 it may be possible to omit one of baffles 54 and 56 and still provide satisfactory filtering.

While baffles 54 and 56 may be simply fabricated as rectangular plates by being bent outward from faceplate 50, in some embodiments it may be preferred to fabricate the baffles so that they have an arcuate cross-section rather than a traverse linear cross-section seen in FIG. 1.

Numerous other modifications, variations and adaptations may be made to the particular embodiments of the invention described above without departing from the scope of the invention, which is defined in the claims.

What is claimed is:

1. A bypass air filter for attachment to an existing return air duct, comprising:
   (a) a housing for retaining a planar air filter, said housing defining a bypass air channel between an air inlet opening and an air outlet opening; and
   (b) an upstream baffle for extending upstream into said return air duct, said upstream baffle extending at an angle substantially perpendicular to said planar air filter when said planar air filter is retained by said housing in order to facilitate air flow through said bypass air channel.

2. The bypass air filter as claimed in claim 1 wherein said upstream baffle is a rectangular plate extending from said housing.

3. The bypass air filter as claimed in claim 1 wherein said upstream baffle is bent outwards from said housing to extend into said return air duct.

4. The bypass air filter as claimed in claim 1 further comprising a fan arranged for facilitating air flow in through said air inlet opening and out through said air outlet opening.

5. The bypass air filter as claimed in claim 1 further comprising a downstream baffle that extends downstream into the air flow path in said existing return air duct for facilitating air flow out of said air outlet opening.

6. The bypass air filter as claimed in claim 1 further comprising a planar air filter retained in said bypass a channel intermediate said air inlet opening and said air outlet opening.

7. The bypass air filter as claimed in claim 6 wherein said planar air filter comprises a pre-filter and a high efficiency particulate arrestance filter.

8. The bypass air filter of claim 6 wherein said housing has an access door for adding and replacing said planar air filter.

9. The bypass air filter of claim 8 wherein said access door is arranged at an oblique angle to said housing to facilitate air flow through said bypass air channel.

10. A bypass air filter for attachment to an existing return air duct, comprising:
    (a) a housing comprising a faceplate and a box;
    (b) said box having an open end;
    (c) said faceplate having an air inlet opening and an air outlet opening;
    wherein said open end of said box is attachable to said faceplate to form a bypass air channel between said air inlet opening and said air outlet opening,
    (d) a fan arranged for facilitating air flow in through said air inlet opening and air out through said air outlet opening;
    (e) an upstream baffle extending from said face plate for extending upstream into the air flow path in said existing return air duct for scooping air into said air inlet opening;
    (f) a downstream baffle extending from said face plate for extending downstream into the air flow path in said existing return air duct for facilitating air flow out of said air outlet opening; and
    (g) a filter retained within said bypass air channel intermediate said air inlet opening and said air outlet opening.

11. The bypass air filter as claimed in claim 10 wherein said box has an access door for adding and replacing said filter.

12. The bypass air filter as claimed in claim 11 wherein said box has a closed end with four contiguous sides extending therefrom to form said open end, one of said sides being a top; wherein said access door forms an oblique wall between said top and said closed end.

13. The bypass air filter in claim 10 wherein said filter comprises a pre-filter and a high efficiency particulate arrestance filter.

14. The bypass air filter in claim 10 wherein said upstream baffle is a rectangular plate.

15. The bypass air filter in claim 10 wherein said upstream baffle and said downstream baffle are bent outwards from said faceplate to form said air inlet opening and said air outlet opening.

16. The bypass air filter in claim 14 wherein said upstream baffle is arranged substantially perpendicular to said filter.

* * * * *

UNITED STATES PATENT AND TRADEMARK OFFICE
CERTIFICATE OF CORRECTION

PATENT NO.   : 6,602,307 B2
DATED        : August 5, 2003
INVENTOR(S)  : Bertrand Poirier It is certified that error appears in the above-identified patent and that said Letters Patent is hereby corrected as shown below:

<u>Title page,</u>
Item [54], Title, delete "FILER" and insert -- FILTER --.

<u>Column 1,</u>
Line 35, delete "a" and insert -- an --.

<u>Column 4,</u>
Line 6, delete "a" after "bypass" and insert -- air --.

Signed and Sealed this

Ninth Day of December, 2003

JAMES E. ROGAN
*Director of the United States Patent and Trademark Office*